United States Patent [19]

Rees et al.

[11] 4,118,122

[45] Oct. 3, 1978

[54] METHOD OF RENDERING OBJECTS UNCOPYABLE BY PHOTOCOPY PROCESSES

[75] Inventors: James D. Rees, Pittsford; Richard F. Lehman, Fairport, both of N.Y.

[73] Assignee: Xerox Corporation, Stamford, Conn.

[21] Appl. No.: 766,465

[22] Filed: Feb. 7, 1977

[51] Int. Cl.$^2$ ........................ G03B 27/32; B42D 15/00

[52] U.S. Cl. ........................................... 355/77; 283/6; 355/133

[58] Field of Search ...................... 355/133, 77, 32, 40; 428/29; 427/197; 40/137; 283/6, 7, 8 B; 117/1

[56] References Cited

U.S. PATENT DOCUMENTS

| | | | |
|---|---|---|---|
| 3,597,082 | 8/1971 | James et al. | 355/133 |
| 3,852,088 | 12/1974 | Godlewski et al. | 355/133 X |
| 3,887,742 | 6/1975 | Reinnagel | 355/133 X |

FOREIGN PATENT DOCUMENTS

| | | | |
|---|---|---|---|
| 1,948,611 | 4/1971 | Fed. Rep. of Germany | 355/133 |

OTHER PUBLICATIONS

IBM Tech. Discl. Bulletin, "Document Copying Inhibitor Method", D. I. Weinberg, vol. 17, No. 12, May 1975, p. 3786.

*Primary Examiner*—Richard A. Wintercorn

[57] ABSTRACT

Techniques to render documents and like objects uncopyable by photocopy means. Illumination spectral composition, object background color, and photoreceptor sensitivity are appropriately combined such that the photoreceptor perceives no object contrast. The result may be either a blackout or a whiteout of the object information.

6 Claims, No Drawings

METHOD OF RENDERING OBJECTS UNCOPYABLE BY PHOTOCOPY PROCESSES

BACKGROUND OF THE INVENTION

The present invention relates to photocopying and more particularly to techniques by which to prevent object copyability by preventing the perception of object contrast by the image receptor.

There are situations where it is desired to render certain documents "copy secure". Of course, no precaution can absolutely prevent document copyability since an ordinary camera can copy anything that is visible. However, it is possible and sometimes desirable to add a degree of security to documents within a single organization by preventing their copyability by the particular photocopying apparatus in general use within that organization.

In other situations, it is sometimes desirable to render parts of documents uncopyable. An example of this exists right in the United States Patent and Trademark Office as well as in all other federal agencies. Under the Freedom of Information Act, government agencies including the Patent and Trademark Office are required to make their records available to public applicants except for such matters thereof "specifically exempted from disclosure by statute". The recent case of Irons v. Gottschalk 191 USPQ 481 relates to the application of this statute to the Patent and Trademark Office, and, citing Vaughn v. Rosen 484 F. 2d 820 (1973) specifically points up one problem of compliance. That is, in cases where government documents contain information which is within the mandate of the Freedom of Information Act as well as information which is exempted from disclosure under the Act, the problem of compliance becomes a problem of document masking or obliterating prior to making the same accessible. The techniques herein are directed toward such an application.

All photocopying processes include as one essential element the optical imaging of an object on a photoreceptor or image receptor. In turn, a prerequisite to recording of an image is the ability of the photoreceptor to perceive contrast in the object. Conversely, a prerequisite to image obliteration is the destruction of object contrast at the image receptor. Object contrast is a function of its color composition, and the spectral response of the optical system by which it is imaged. Spectral response is, in turn, a product of the spectral composition of the object illumination and the spectral sensitivity of the photoreceptor.

It is an object of this invention to provide the basis for techniques by which documents can be rendered copy secure as to one or more types of photocopying equipment.

Another object of this invention is to provide techniques for the simple and selective masking of documents for photocopying, for example in compliance with Freedom of Information Act requests.

Other objects, advantages, and features of this invention will become apparent from the following more detailed description thereof.

DESCRIPTION

A general statement of the principle of this invention is as follows: If an object document background color is complementary to the spectral response of a photocopying system, there is no object contrast perceived at the image receptor of the system and thus information on the object is uncopyable. The converse to this principle is that if object characters or information are of a color to match the spectral response of a photocopying system, there is no object contrast perceived at the image receptor and the information is uncopyable.

Based on the foregoing, the following tabulation matches object background color in the left-hand column with system spectral response in the right-hand column in combinations resulting in no object contrast at the image receptor. These combinations result in uncopyability because of blackout of object information at the image receptor.

| OBJECT DOCUMENT BACKGROUND COLOR | SYSTEM SPECTRAL RESPONSE |
|---|---|
| yellow | blue |
| red | cyan |
| cyan | red |
| magenta | green |
| blue | yellow |
| green | magenta |

Based on the converse principle stated above, the following tabulation matches information color in the left-hand column with system spectral response in the right-hand column in combinations resulting in no object contrast at the image receptor. These combinations result in uncopyability because of whiteout of object information at the image reception.

| INFORMATION OR CHARACTER COLOR | SYSTEM SPECTRAL RESPONSE |
|---|---|
| yellow | yellow |
| red | red |
| cyan | cyan |
| magenta | magenta |
| blue | blue |
| green | green |

Object background color may be controlled in several ways. It may be supplied as being the color of the blank paper on which the original document is created, it may be applied as with a marking instrument, or it may be superimposed by application of a color filter to the face of the object document. Examples of marking instruments are felt-tip markers, particularly the yellow Carter's Hi-Liter ® in general use. Examples of superimposed filters are color film overlays and colored graphic tapes, well known in the graphic arts. These can be used for total or selective partial coverage.

Photocopying system spectral response is the product of the spectral composition of the object illumination and the spectral sensitivity of the photoreceptor. This means that system spectral response is no broader than the narrower of its components. Thus, a system which includes panchromatic light and a panchromatic photoreceptor has a panchromatic spectral response. A system including blue light and a panchromatic photoreceptor has only a blue spectral response. In short, the spectral response of the system can be narrowed or controlled by controlling one or the other of the two parameters, spectral composition of the illumination or spectral sensitivity of the photoreceptor.

As a practical matter, it is simpler to control the spectral composition of the object illumination by choosing suitable light sources which emit in the desired spectral range.

In a preferred embodiment of this invention, blue emitting light sources are used in a photocopying system having either a blue-sensitive or panchromatic photoreceptor. The product of these choices is a system of blue spectral response. Now, with this system, object documents having yellow background are uncopyable. This is a most desirable combination for several reasons. First, yellow background documents are easily readable. Indeed, yellow highlighting, as by felt-tip markers, is a widely practiced method of emphasizing printed matter. Second, photocopying systems of blue spectral response are widely available. Most of the current copier and duplicator products of Xerox Corporation either have blue spectral response or can be easily converted to have blue spectral response by using blue light sources.

While the yellow object background-blue spectral response combination is the preferred technique of this invention, other combinations of varying degrees of efficacy and desirability are disclosed in the foregoing tabulations. The concept and scope of the invention are limited only by the following claims and equivalents thereof which may occur to others skilled in the art.

What is claimed is:

1. A method of masking at least a portion of an object document to render information thereon uncopyable by a photocopying system having a spectral response in a first color, by providing for said information a background of a second color complementary to said first color by the superimposition of a color film thus to eliminate object contrast and to black out said information at the image receptor of said photocopying system.

2. A method of masking at least a portion of an object document to render information thereon uncopyable by a photocopying system having a spectral response in a first color, by providing for said information a background of a second color complementary to said first color said background provided by the application of a masking instrument, thus to eliminate object contrast and to black out said information at the image receptor of said photocopying system.

3. A method of masking an object document to render information thereon uncopyable by a photocopying system comprising the steps of:

providing a photoreceptor having a spectral response of a first color, providing object illumination to said photoreceptor, said illumination having a spectral composition of the same color sensitivity as said photoreceptor, and providing for said information a background of a second color complementary to said first color, thereby eliminating object contrast and blacking out said information at said photoreceptor.

4. The method of claim 3 in which said object illumination is a blue-emitting light source, said photoreceptor has a blue spectral response and said information background is yellow.

5. The method of claim 4 in which said photoreceptor is panchromatic.

6. A method of creating an object document to render information thereon uncopyable by a photocopying system comprising the steps of:

providing a photoreceptor having a spectral response of a first color, providing object illumination to said photoreceptor, said illumination having a spectral composition of the same color sensitivity as said photoreceptor and applying the information to said object document in the same color, thereby eliminating object contrast and whiteing out said information at the image receptor of said photocopying system.

* * * * *